May 5, 1925.
J. HARRIS
MAXIMUM DEMAND METER
Filed Oct. 23, 1922
1,536,097
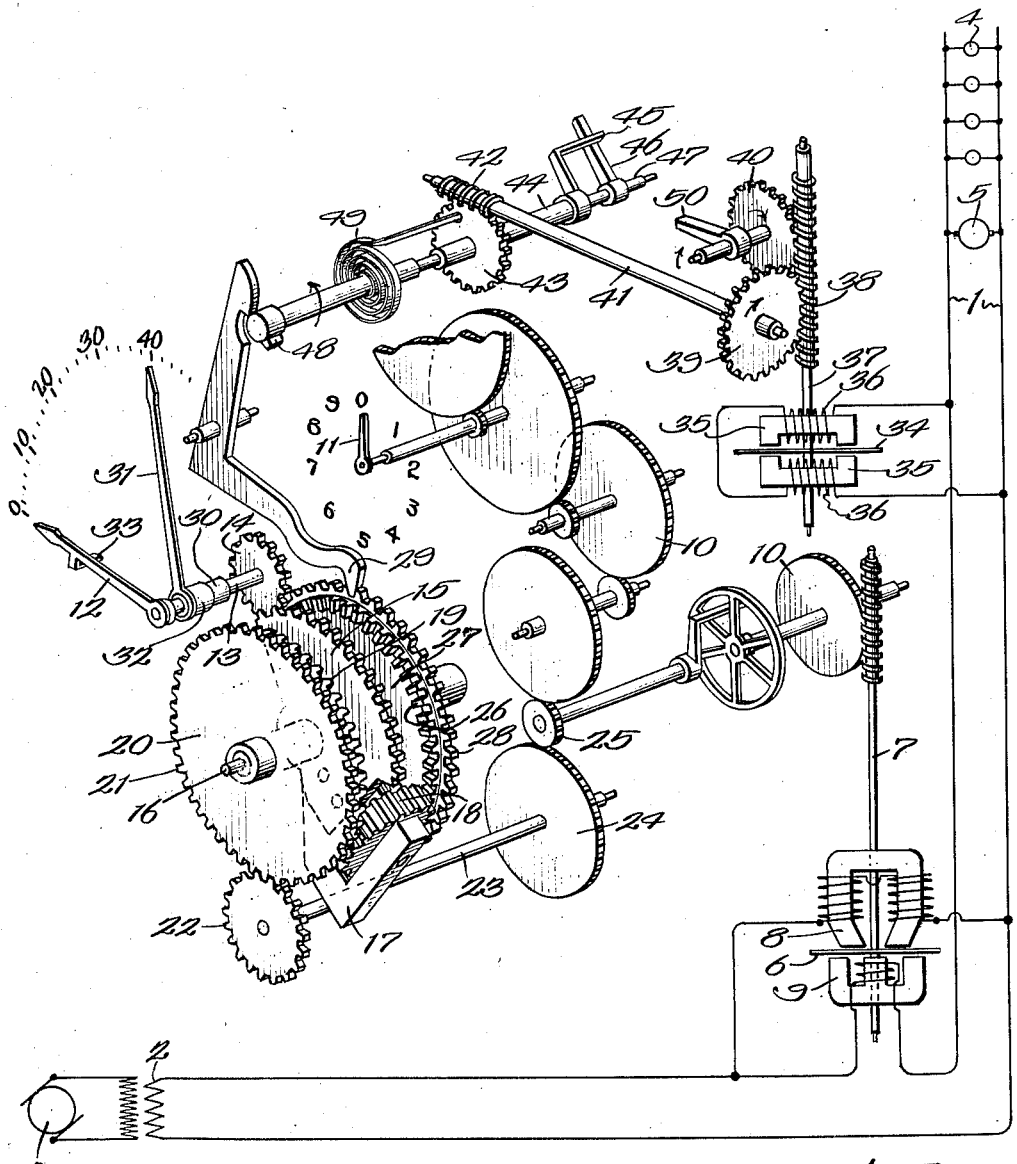
Inventor:
Jesse Harris.
By G. L. Gragg atty.

Patented May 5, 1925.

1,536,097

UNITED STATES PATENT OFFICE.

JESSE HARRIS, OF LAFAYETTE, INDIANA, ASSIGNOR TO DUNCAN ELECTRIC MANUFACTURING COMPANY, OF LAFAYETTE, INDIANA, A CORPORATION OF ILLINOIS.

MAXIMUM-DEMAND METER.

Application filed October 23, 1922. Serial No. 596,218.

*To all whom it may concern:*

Be it known that I, JESSE HARRIS, citizen of the United States, residing at Lafayette, in the county of Tippecanoe and State of Indiana, have invented a certain new and useful Improvement in Maximum-Demand Meters, of which the following is a full, clear, concise, and exact description.

My invention relates to electricity metering systems and to indicating and resetting devices which may be so associated with the watt meters employed in such systems as to constitute such meters maximum demand meters.

In carrying out my invention I employ an electric motor having current and pressure windings connected with a lighting or other consumption circuit and co-operating to produce motion proportionally to the wattage. I also employ a constant speed motor which is preferably also an electric motor subject to the pressure of the system. The first motor may constitute the motor element of an ordinary watt meter and both motors operate in conjunction with the indicating and resetting device of my invention to constitute the watt meter a maximum demand meter also. By means of the mechanism of my invention a pointer serves to indicate the maximum demand placed upon a consumption circuit during any predetermined period terminated when the meter is read, say once a month. A pusher, preferably in the form of another pointer, may be caused to swing in a forward direction at measured intervals, say each fifteen minutes, during the metering period. A holder serves to maintain the pointer in the position to which it may be pushed by the pusher. During some fifteen minute interval the pusher may not reach the previous position of the pointer so that the pointer is then not disturbed but when the pusher moves to a further position during some succeeding interval the pointer is correspondingly advanced. It remains in the furthest position to which it is set during the metering period. After each forward movement of the pusher during any fifteen minutes or other predetermined interval it is restored to normal. In the preferred embodiment of the invention a pinion is in connection with the pusher for turning it and there is a loosely mounted gear element in mesh with the pinion. There is a second pinion carried by and movable bodily with this gear element and also a driving gear, driven by the watt meter motor, that is in mesh with the second pinion. There is a second loosely mounted gear element also in mesh with the second pinion and a releasable holding dog for holding this second gear element in order to constitute it a track upon which the second pinion may travel in order to turn the gear element which carries the second pinion and thereby turn the first pinion that is coupled with the pusher. This holding dog may be released by a cam which is periodically operated by the constant speed motor. When the dog is released the weight of the first aforesaid gear element and the aforesaid second pinion carried by this gear element is sufficient to restore these parts to normal and occasion the restoration of the pusher to normal. The pointer, however, remains where it is placed by the pusher. Whenever the meter is read this pointer is restored to normal.

I will explain my invention more fully by reference to the accompanying drawing which is a diagrammatic view illustrating a consumption circuit and a watt meter associated with the preferred form of equipment of my invention.

The consumption circuit 1 illustrated is supplied with alternating current by means of a transformer 2 whose primary is in circuit with an alternating current generator 3. The circuit is illustrated as supplying incandescent lamps 4 and a motor 5, though it is understood any character of load may be furnished with current by the circuit. It is also to be understood that the invention is not to be limited to an alternating current system of distribution.

I have illustrated one of many forms of watt meters whose motor may be employed in practicing my invention. The disc armature 6 of the motor shown is upon a spindle 7 and turns between the poles of magnets 8 and 9 that are wound with coils respectively in bridge of and in series with the consumption circuit respectively to be subject to the pressure and current of the system. The meter spindle is provided with any usual or suitable gear 10 through the intermediation of which the integrating watt meter indexes 11 may be operated in a manner well understood. The meter spindle 7 is also caused to operate the pusher 12 that is also in the form of a pointer. The shaft 13 of this pusher carries a pinion 14 that is in mesh with a segmental gear 15 loosely mounted upon the shaft 16. This segmental gear carries a support 17 for a pinion 18. This pinion is in mesh with the teeth 19 that are radially placed upon a gear wheel 20 which also carries spur teeth 21 that are in mesh with the pinion 22 upon the shaft 23 upon which there is also disposed a spur gear 24 in mesh with a pinion 25 that is common to the gearing 10 and the gearing 24, 23, etc. The pinion 18 is thus moved proportionally to the wattage. In order that the pusher 12 may be moved proportionally to the wattage the pinion 18 is also placed in mesh with the teeth 26 that are radially placed upon a gear wheel 27, loose upon the shaft 16, which also carries spur teeth 28 that are engageable by a holding dog 29. When the dog is in holding position the wheel 18 will travel upon the track 26 to turn the segmental gear 15 and to cause the corresponding movement of the pointer 12 through a range of movement which corresponds to the wattage that is consumed in the system during the predetermined measuring interval, it being preferred to release the dog 29 once each fifteen minutes to cause the pusher to be restored to normal by the weight of the segmental gear 15 and the pinion 18 thereon.

The shaft 13 passes loosely through a sleeve 30. A pointer 31 has a hub 32 which is in frictional engagement with the sleeve 30 that constitutes a pointer holder that serves to maintain the pointer in any position to which it is moved. The pusher 12 carries an arm 33 that is in pushing relation to the pointer 31 if the range of movement of the pusher 12 is sufficient in any given fifteen minute interval. When the dog 29 is released the pusher 12 will be restored to normal, leaving the pointer 31 in the position to which it is brought by the pusher during the fifteen minute interval in which the pusher had its maximum movement toward the pointer. The holding dog 29 is desirably periodically released by means of a constant speed motor which is preferably an electric motor comprising a disc armature 34, the field cores 35, the pressure windings 36 in bridge of the circuit 1 and a spindle 37 that carries the armature. A worm 38 is provided upon the spindle and is in driving relation to two pinions 39 and 40. The pinion 39 is upon a shaft 41 which carries a worm 42. This worm is in mesh with a pinion 43 that is fixed upon a quill shaft 44 which carries an arm 45. A second arm 46 is upon a shaft 47 which carries a cam 48. The shaft 47 is loose within the quill shaft 44, the arm 46 being normally maintained in engagement with arm 45 by means of a coiled spring 49 connected at one end with the shaft 47 and at the other end with the pinion 43 rigid upon the shaft 44. A third arm 50 is upon the shaft of the pinion 40, the planes of rotation of the arms 45 and 50 being coincident. At the termination of each fifteen minute interval or other predetermined interval the arms 50 and 46 are engaged to cause a rapid turning movement of the shaft 47 to occasion a quick operation of the cam 48 that is followed by a quick release and restoring movement of the dog 29. In the interval that intervenes between the releasing movement of the dog 29 and the disengagement of the cam 48 from the dog to permit the dog to reengage its gear the pusher 12 has opportunity to become restored to normal substantially at the inception of a new interval.

By way of recapitulation, the operation of the resetting device is described as follows:—The spindle 37 is driven by the motor and drives shaft 41 by means of the worm wheel 38 and gear 39, which, in turn and by means of the worm gear 42, drives the gear 43 that is mounted upon a sleeve 44 to which the crank piece 45 is also fastened. Passing through and supporting the sleeve 44 is the spindle 47 which carries the lever arm 46 on one end and the spring 49 and the projection 48 on the other, the spring serving to hold the crank piece 45 and the lever arm 46 in contact.

The worm wheel 40 is driven by the worm 38, and is at right angles to and independent of the gear 39, causing the lever arm 50 to be driven several revolutions to one revolution of the spindle 47.

It follows that when the lever arm 46 is carried forward, (counter clockwise), and the projection 48 is nearing the catch in the right angle piece 29, the lever arm 46 will be a little in advance and overlapping the lever arm 50, which, moving at a higher speed, will advance it quickly and cause the projection 48 to lift the latch 29 from wheel 28 allowing the element 17 to take its lowest position to reset the pointer 12 to zero very quickly through the gear segment 15 and pinion 14.

The utility of the equipment of my invention will be fully understood by those familiar with the art without further description.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a metering system, the combination with a consumption circuit; of a constant speed electric motor supplied from said circuit; a second electric motor having current and pressure windings supplied from said circuit and operating proportionally to the wattage; and a resetting device including a pointer, a holder serving to maintain the pointer in the position to which it is moved, a pusher in pushing relation to the pointer when the pusher is moved in one direction and free of the pointer when the pusher is moved in the reverse direction, a pinion in connection with the pusher for turning it, a loosely mounted gear element in mesh with the pinion, a second pinion carried by said gear element, a driving gear in mesh with the second pinion, a second loosely mounted gear element also in mesh with the second pinion, a releasable holding dog for holding the second loosely mounted gear element, a cam in periodic releasing engagement with said dog and driven by said constant speed motor, and gearing coupling the second pinion with the second motor.

2. In a metering system, the combination with a consumption circuit; of a constant speed motor; a second motor having current and pressure windings supplied from said circuit and operating proportionally to the wattage; and a resetting device including a pointer, a holder serving to maintain the pointer in the position to which it is moved, a pusher in pushing relation to the pointer when the pusher is moved in one direction and free of the pointer when the pusher is moved in the reverse direction, a pinion in connection with the pusher for turning it, a loosely mounted gear element in mesh with the pinion, a second pinion carried by said gear element, a driving gear in mesh with the second pinion, a second loosely mounted gear element also in mesh with the second pinion, a releasable holding dog for holding the second loosely mounted gear element, a cam in periodic releasing engagement with said dog and driven by said constant speed motor, and gearing coupling the second pinion with the second motor.

3. In a metering system, the combination with a consumption circuit; of a constant speed electric motor supplied from said circuit; a second electric motor having current and pressure windings supplied from said circuit and operating proportionally to the wattage; and a resetting device including a pointer, a holder serving to maintain the pointer in the position to which it is moved, a pusher in pushing relation to the pointer when the pusher is moved in one direction and free of the pointer when the pusher is moved in the reverse direction, a pinion in connection with the pusher for turning it, a loosely mounted gear element in mesh with the pinion, a second pinion carried by said gear element, a driving gear in mesh with the second pinion, a second loosely mounted gear element also in mesh with the second pinion, a releasable holding dog for holding the second loosely mounted gear element, a cam in periodic releasing engagement with said dog, an arm moving with the cam, a second arm in turning engagement with the first and driven by the constant speed motor, a spring coupling and maintaining the two arms normally in engagement, a third arm also driven by the constant speed motor and intermittently engaging the first arm to move it rapidly against the force of said spring to secure rapid dog releasing movement of the arm, and gearing coupling the second pinion and the second motor.

4. In a metering system, the combination with a consumption circuit; of a constant speed motor; a second motor having current and pressure windings supplied from said circuit and operating proportionally to the wattage; and a resetting device including a pointer, a holder serving to maintain the pointer in the position to which it is moved, a pusher in pushing relation to the pointer when the pusher is moved in one direction and free of the pointer when the pusher is moved in the reverse direction, a pinion in connection with the pusher for turning it, a loosely mounted gear element in mesh with the pinion, a second pinion carried by said gear element, a driving gear in mesh with the second pinion, a second loosely mounted gear element also in mesh with the second pinion, a releasable holding dog for holding the second loosely mounted gear element, a cam in periodic releasing engagement with said dog, an arm moving with the cam, a second arm in turning engagement with the first and driven by the constant speed motor, a spring coupling and maintaining the two arms normally in engagement, a third arm also driven by the constant speed motor and intermittently engaging the first arm to move it rapidly against the force of said spring to secure rapid dog releasing movement of the cam, and gearing coupling the second pinion and the second motor.

5. A resetting device including a pointer; a holder serving to maintain the pointer in the position to which it is moved; a pusher in pushing relation to the pointer when the pusher is moved in one direction and free of the pointer when the pusher is moved in the reverse direction; a pinion in connection with the pusher for turning it; a loosely mounted gear element in mesh with the pinion; a second pinion carried by said gear element; a driving gear in mesh with the second pinion; a second loosely mounted gear element also in mesh with the second pinion; and a releasable holding dog for holding the second loosely mounted gear element.

6. A resetting device including a pointer; a holder serving to maintain the pointer in the position to which it is moved; a pusher in pushing relation to the pointer when the pusher is moved in one direction and free of the pointer when the pusher is moved in the reverse direction; a pinion in connection with the pusher for turning it; a loosely mounted gear element in mesh with the pinion; a second pinion carried by said gear element; a driving gear in mesh with the second pinion; a second loosely mounted gear element also in mesh with the second pinion; a releasable holding dog for holding the second loosely mounted gear element; a releasing cam periodically engageable with said dog to release it; and a constant speed motor in driving relation to the cam.

7. The combination with two normally engaged rotatable arms; of a motor in driving relation with one arm; a spring normally holding the other arm in engagement with the first; and a third arm, also driven by said motor, that is periodically engageable with the arm that is controlled by the spring.

In witness whereof, I hereunto subscribe my name this 17th day of October A. D., 1922.

JESSE HARRIS.